(12) United States Patent
Hisky et al.

(10) Patent No.: US 12,379,941 B2
(45) Date of Patent: Aug. 5, 2025

(54) INTEGRATED CIRCUIT WITH MULTIFUNCTION CAPABILITY

(71) Applicant: Cirrus Logic International Semiconductor Ltd., Edinburgh (GB)

(72) Inventors: David Hisky, Austin, TX (US); Daniel Weber, Austin, TX (US); Jonathan E. Eklund, Austin, TX (US); Adam Brickman, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/326,420

(22) Filed: May 31, 2023

(65) Prior Publication Data

US 2023/0409348 A1  Dec. 21, 2023

Related U.S. Application Data

(60) Provisional application No. 63/350,094, filed on Jun. 8, 2022.

(30) Foreign Application Priority Data

Sep. 2, 2022 (GB) ...................................... 2212815

(51) Int. Cl.
*G06F 9/445* (2018.01)
*G06F 8/61* (2018.01)

(52) U.S. Cl.
CPC ............ *G06F 9/44505* (2013.01); *G06F 8/61* (2013.01)

(58) Field of Classification Search
None
See application file for complete search history.

(56) References Cited

U.S. PATENT DOCUMENTS

| 11,748,285 | B1 * | 9/2023 | Haim | G06F 13/4282 |
| | | | | 710/305 |
| 2007/0272073 | A1 * | 11/2007 | Hotta | G10H 1/0066 |
| | | | | 84/600 |
| 2015/0149661 | A1 * | 5/2015 | Kanigicherla | G06F 13/10 |
| | | | | 710/62 |
| 2019/0235890 | A1 | 8/2019 | Schnoor et al. | |
| 2021/0232515 | A1 * | 7/2021 | Govindarajan | G06F 13/20 |

OTHER PUBLICATIONS

Combined Search and Examination Report under Sections 17 and 18(3), UKIPO, Application No. GB2212815.1, dated Apr. 4, 2023.

* cited by examiner

*Primary Examiner* — Fahmida Rahman
(74) *Attorney, Agent, or Firm* — Jackson Walker L.L.P.

(57) ABSTRACT

In an example there is provided an integrated circuit configured to perform a plurality of functions, the integrated circuit comprising a memory, wherein each function of the integrated circuit is configured to transmit a request to a processor, and wherein the integrated circuit is configured such that the first function to detect that its request has been serviced by the processor is configured to download firmware and/or configuration data for itself and for at least one other function.

7 Claims, 5 Drawing Sheets

INTEGRATED CIRCUIT WITH MULTIFUNCTION CAPABILITY

The present disclosure claims priority to U.S. Provisional Patent Application Ser. No. 63/350,094, filed Jun. 8, 2022, and United Kingdom Patent Application No. GB2212815.1, filed Sep. 2, 2022, each of which is incorporated by reference herein in its entirety.

TECHNICAL FIELD

Examples described herein relate to integrated circuits, for example integrated circuits for protecting and/or controlling the functionality of itself and/or an output component.

BACKGROUND

Many computing platforms interface with an output component via an integrated circuit (hereafter, "IC"). In these examples, a processor may be in communicative contact with the output component (which may be referred to as a peripheral device) via the IC or, more specifically, via a signal path through the IC. The processor may protect and/or control a function and/or parameter of the IC and/or the output component.

In examples where the IC is configured to control a plurality of output components, the IC may permit a plurality of signal paths, and may store associated firmware and/or configuration data etc., for those components to be controlled and/or protected. However, the task of loading configuration data and/or executable firmware into the memory of the IC can, if done incorrectly, lead to issues such as, for example, unnecessary memory re-initialisation, no initialisation, increased latency and/or memory corruption if not done properly and loading the aforementioned data/firmware can become difficult for an IC configured to control and/or protect many output components.

The present examples are concerned with providing a multifunction IC that can efficiently handle the initial load of configuration data and/or common firmware.

SUMMARY

According to an example there is provided an integrated circuit configured to perform a plurality of functions, the integrated circuit comprising a memory, wherein each function of the integrated circuit is configured to transmit a request to a processor, and wherein the integrated circuit is configured such that the first function to detect that its request has been serviced by the processor is configured to download firmware and/or configuration data for itself and for at least one other function.

The first function to detect that its request has been serviced by the processor may be configured to load the firmware and/or configuration data into the memory of the integrated circuit.

The first function to detect that its request has been serviced by the processor may be configured to download and load into the memory firmware and/or configuration data for each of the plurality of functions of the integrated circuit.

The integrated circuit may be configured to determine whether the memory is fully initialised and wherein each function is configured to download the firmware and/or configuration data if it is determined that the memory is not fully initialised.

The integrated circuit may be configured to determine whether an initialisation of the memory is in progress and wherein each function downloads the firmware and/or configuration data if it is determined that no initialisation of the memory is in progress.

The integrated circuit may be configured such that the operation of each function other than the first function to detect that its request has been serviced by the processor is blocked or held or placed in a wait state until the loading of the firmware and/or configuration data is complete.

The request may be one of a file transfer request or a register write request. The request may be made by utilising an SDCA class-conformant function mechanism.

The or each function other than the first function to detect that its request has been serviced by the processor may be blocked or held or placed in a wait state by utilising a class-conformant function mechanism.

According to an example there is provided an integrated circuit having a plurality of functions, wherein the integrated circuit is configured to communicate with a processor, and wherein the integrated circuit is configured to determine that the processor is enabled and running by transmitting, by one function, a request to the processor and, upon detection that the processor has serviced the request, the integrated circuit is configured to transmit a request for an initialisation write to load, via the function, firmware and/or configuration data for the function and at least one other function into a common memory space of the integrated circuit.

According to an example there is provided an integrated circuit configured to perform a plurality of functions, the integrated circuit comprising a memory, wherein one function of the integrated circuit is configured to transmit a request to a processor, and wherein the integrated circuit is configured such that the one function is configured to download firmware and/or configuration data for itself and for at least one other function, and load the firmware and/or configuration data into the memory of the integrated circuit.

According to an example there is provided an integrated circuit having a plurality of functions, wherein the integrated circuit is configured such that one function of the plurality is to download and install firmware and/or configuration data for all of the functions into the memory of the integrated circuit while the remaining functions are blocked/placed in a hold state.

BRIEF DESCRIPTION OF THE DRAWINGS

The present disclosure may be understood with reference to the accompanying drawings in which.

DETAILED DESCRIPTION

Figure 1:
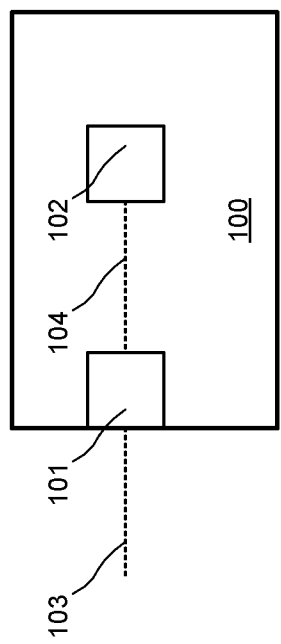
FIGS. 1 and 2 are simplified schematic diagrams of example integrated circuits.

FIG. 1 is a simplified schematic of an example IC 100. The IC comprises a control register (or a plurality or set of control registers), which may also be referred to as address ranges, which may comprise any one or more of: an internal addressable space of the IC, an electronic register, a programmable data memory and/or a programmable data structure. In this document, the terms "address range" and "addressable space", and "address ranges" and "addressable spaces" may be used interchangeably. Furthermore, the terms "address range" and "memory location", and "address ranges" and "memory locations" may be used interchangeably.

FIG. 1 shows an IC 100 comprising an interface 101 that is configured to couple the IC 100 (via coupling path 103) to a (not-shown) processor, which may be referred to as an external processor or a host processor. The processor may be running an operating system. The IC 100 also comprises a control register 102, and the interface 101 is connected to the control register 102 (via the coupling path denoted by 104). The control register 102 stores bit fields that define various functions and/or parameters of the IC 100. The IC 100 in this example is a "multifunction IC" and is therefore an IC having a plurality of the same and/or similar and/or different functions. Accordingly, the control register 102 comprises a plurality of blocks of register addresses, each block allocated to a function of the IC 100. Each function (plurality of blocks of register addresses) comprises at least one entity, being a block that is identifiable, and at least one entity is reserved for function/parameter-level configurations. The entities therefore describe how software (e.g. running on a host processor) views the signal paths internal to the IC 100 to achieve the desired functionality. In one example, the IC 100 may be configured such that each function type (therefore each plurality of blocks of register addresses) is pre-defined and therefore the functions of the IC 100 are pre-defined.

It will be appreciated that dotted lines within the IC 100 denote signal paths within the IC and dotted lines terminating at, or emanating from, the IC 100 denote the IC communicating wirelessly or by wired coupling (or a combination of both) with an external entity such a processor or other device that is controlling the IC and/or is controlled by the IC.

During runtime, the IC 100 may be connected to at least one output component in which case the IC 100 will be configured to control the output component. The control register 102 therefore comprises a number of controls, for each entity, that are stored in the register 102 to allow the IC 100 to control the output component. For example, the output component may comprise an amplifier and/or a transducer such as a microphone and/or speaker for example and the control register 102 may store data relating to the output component such as for example volume control, gain control, mute etc. In this way, a "function" and/or "parameter" of the IC 100 may be synonymous with the output component(s) that it is configured to be controlled. For the IC 100 to control such output components, firmware pertaining to those functions and/or parameters will be downloaded and loaded into the control register 102 of the IC 100. This may be done via, or under the control of, a corresponding host driver, meaning a driver of the host processor that corresponds to the or each function and/or parameter which may be implemented in software, e.g. of an operating system running on the processor. It should be noted that "function" and "parameter" may be used interchangeably.

The control register 102 may comprise a layered architecture in terms of how its various functions are encoded in the address ranges, and may be configured through sets of RAM-based firmware registers and handshaking interfaces. A first set of address ranges may comprise ROM-accessed RAM states, a second set of address ranges may comprise boot configuration registers, a third set of address ranges may comprise patch RAM states, a fourth set of address ranges may comprise control registers, a fifth set of address ranges may comprise human interface device (HID) buffer registers, and a sixth set of address ranges may comprise the functions (as described above).

According to the invention, the IC 100 is configured to manage the initial load of common firmware and/or configuration data into the shared/common memory space (the control register 102) of the IC 100. Via the interface 101, each function programmed in the IC 100 and according to the data stored in the control register 102, is configured to determine whether its corresponding driver in the host processor is loaded and/or operable. Each function of the IC 100 is configured to handle the initialisation of the (entire) common memory space and/or to be aware of the configuration state of the common memory space and/or to alter its interaction with the host processor (e.g. the driver thereof), for example depending on how much initialisation it is determined that the IC 100 requires. In particular, the IC 100 is configured such that the processes described above may occur independently of the order in which the firmware and/or configuration data of the functions are loaded into the IC 100.

Any initialisation action on the part of a corresponding host driver indicates that the function is enabled. The IC 100 (e.g. each one of its functions) is configured to determine whether an associated host driver is operable by transmitting a request to the host processor and determining whether that request has been serviced by the host processor (e.g. the corresponding driver thereof). The first function whose request is detected as serviced is configured to request a transfer of all of the shared memory contents of the IC 100, meaning all of the firmware and/or configuration data for all functions (not only the first function) and this is downloaded and loaded into the control register 102. One function (the first whose requested is service) therefore handles the initialisation write for each function (and the IC 100) according to the invention. In this way, the abovementioned problems such as unnecessary memory re-initialisation, no initialisation, increased latency and/or memory corruption etc. are avoided. Loading of the firmware/configuration data by one function may be done only if it is detected that the shared memory space is not fully initialised and/or that no initialisation is already in progress.

One or more of all of the functions of the IC 100 may comprise audio functions for example. The IC 100 may comprise an audio device (e.g. a multifunction audio device) such as an audio processor or audio codec. The IC 100 may comprise a MIPI SoundWire® audio device. As such, each function may comprise an SDCA function (SDCA meaning "SoundWire Device Class Audio," which is the standardized interface found on MIPI SoundWire® audio devices). The SDCA specification defines a hierarchical encoding to interface with Class-defined capabilities. A block of 64 MBytes of register addresses is allocated to SDCA controls. The 26 LSBs which identify individual controls are set based on the following variables:

Function Number
  An SCDA device can be split in up to 8 independent Functions. Each of these Functions is described in the SDCA specification, e.g. Smart Amplifier, Smart Microphone, Simple Microphone, Jack codec, HID, etc.

Entity Number
  Within each Function, an Entity is an identifiable block. Up to 127 Entities are connected in a pre-defined graph (like USB), with Entity0 reserved for Function-level configurations. In contrast to USB, the SDCA specification pre-defines Function Types, topologies, and allowed options, i.e. the degree of freedom is not unlimited to limit the possibility of errors in descriptors leading to software quirks.

Control Selector

Within each Entity, the SDCA specification defines up-to 48 controls such as Mute, Gain, Automatic Gain Control (AGC) etc., and 16 implementation defined ones. Some Control Selectors might be used for low-level platform setup, and other exposed to applications and users. Note that the same Control Selector capability, e.g. Latency control, might be located at different offsets in different entities—the Control Selector mapping is Entity-specific.

Control Number

Some Control Selectors allow channel-specific values to be set, with up to 64 channels allowed. This is mostly used for volume control.

Current/Next Values

Some Control Selectors are 'Dual-Ranked'. Software may either update the Current value directly for immediate effect. Alternatively, software may write into the 'Next' values and update the SoundWire 1.2 'Commit Groups' register to copy 'Next' values into 'Current' ones in a synchronized manner. This is different from bank switching which is typically used to change the bus configuration only.

MBQ

The Multi-Byte Quantity (MBQ) bit is used to provide atomic updates when accessing more than one byte, for example a 16-bit volume control would be updated consistently, the intermediate values mixing old MSB with new LSB are not applied.

The above six (6) described variable parameters are used to build a 32-bit address to access the desired Controls. Because of address range, paging is required, but the most often used parameter values are placed in the lower 16 bits of the address. This helps to keep the paging registers constant while updating Controls for a specific Device/Function.

Each function may be an audio function. Each function may comprise a class-specific entity that describes how software running on an external processor views signal paths internal to the IC 100 to achieve the desired functionality. In one example, the IC 100 may be configured to implement the following four SDCA functions: Simple Amplifier, Simple Microphone, Universal Audio Jack (UAJ), and a Network Digital Audio Interface (NDAI). The IC 100 may comprise an extension unit for each function, being an element contained in one (or more) SDCA audio functions. Accordingly, the firmware/configuration data may be compatible with the SDCA specification.

The transmitted request may comprise any one or more of: a request for a specific and/or defined initialisation write, a request for a dummy or token file download and/or a specific operation of the function. The transfer of all shared memory contents may be requested using an SDCA class-conformant function mechanism, such as a file download (FDL) set request, a request for a set of files or control writes, a request to load a set of files or write a set of controls, or other mechanism(s).

The IC 100 may be configured to determine which functions are operable and/or that shared initialisation is in progress, e.g. by another function. The IC 100 may be configured to block the operation of each function other than the function by virtue of which the shared memory contents are requested (the "initialising function"), for example until the download of the shared memory contents (e.g. initialisation) is complete. Operation of a function may be blocked by any one or more of: stalling a file download set request, stalling an state machine, or setting a FUNCTION_BUSY bit in the control register 102, or other mechanism(s). In this way, blocking the function is equivalent to placing the function in a block, hold, or wait, state.

As the downloading and installing of the shared memory contents may comprise firmware and/or configuration data for each function the above mechanism may be a mechanism to initialise the IC 100 by initialising the shared resources of the IC 100. The IC 100 is configured such that any function that is blocked may be released (e.g. the block of those other functions is released) when it is determined that the initialising function has finished servicing all of the shared resources required to initialise the IC 100 as a whole. Once the block (or hold/wait) is released, each function is able to present itself to the host processor (e.g. to its respective host driver) that it is ready for normal operation.

Flags may be used to indicate whether the functions are initialised or not and after the first function initialises the shared memory for all of the other functions, the appropriate flags may be cleared.

In this way, a mechanism to load the IC 100 with firmware and/or configuration data to thereby initialise the IC 100 and its functions is provided that avoids the aforementioned problems such as inefficient or problematic initialisation and associated hazards. In turn, this leads to increased system performance and robustness.

The IC 100 also provides flexibility in its configuration by an external processor. For instance, drivers on the processor may be orthogonal to one another and may not share information. Additionally, some functions may be disabled. This could create a problem loading firmware into an IC because of the difficulty in knowing (e.g. in advance) which drivers are loaded and operable at any given time. The IC 100 solves the problem of having two drivers downloading and loading files at the same time, creating overlap or unnecessary repetition (which could lead to problems such as glitching or latency, in addition to reducing the aforementioned redundant loading of firmware).

Figure 2:
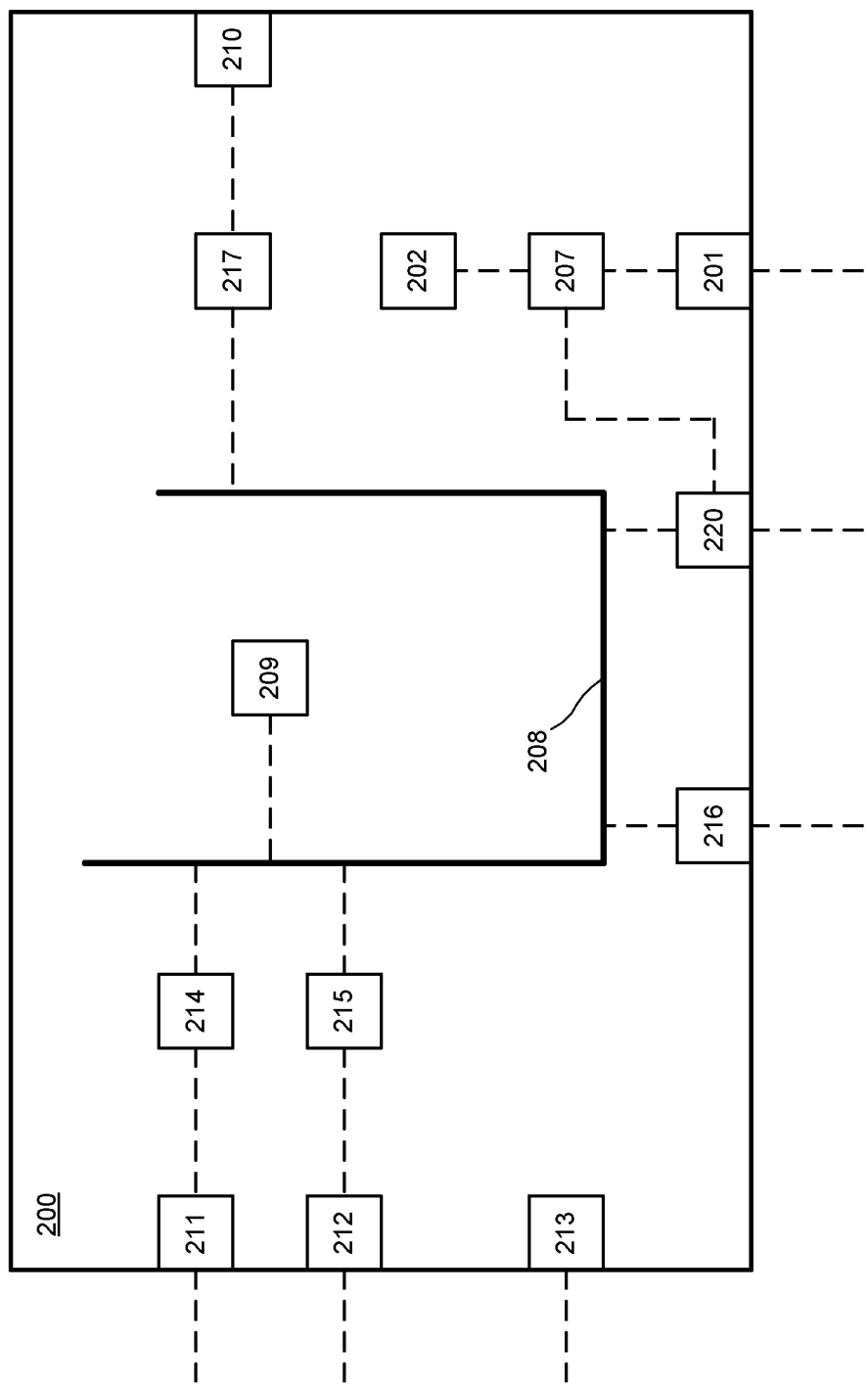

FIG. 2 shows a simplified schematic of an example IC 200, which may comprise the IC 100 as shown in and described with reference to FIG. 1. As above, the dotted lines through the IC 200 denote various signal paths through the IC 200. The IC 200 comprises an interface 201 which is a first interface and which may be as described above for the interface 101, and a control register 202 which may be as described above for the control register 102. In particular, the control register 202 comprises a plurality of blocks of register addresses, with each block allocated to a function of the IC 200 such that the IC 200 is a multifunction IC, or an IC having a plurality of functions, with each function (plurality of blocks of register addresses) comprising at least one entity, being a block that is identifiable, being reserved for function-level configurations.

The interface 201 communicates with a not-shown external processor having a plurality of drivers (one per function of the IC 200) as described above with reference to FIG. 1. In this example, the IC 200 comprises an access control unit 207 and communication between the interface 201 and the control register 202 is via the access control unit 207. The IC 200, via the access control unit 207 is configured to check and verify that an incoming request to access the control register 202 has the correct access permissions. For example, a request to write firmware to a set of address ranges of the control register 202 will need a corresponding write permission to be successful, and this permission may be checked at the access control unit 207. The access control unit 207 may comprise a policy table storing such an access permission etc. and a gate configured to permit/deny a given access requested based on the associated access permission stored in the table.

The IC 200 of this example has an analogue-to-digital converter (ADC), indicated at 211, and a pulse density modulator (PDM), indicated at 212, each of which are configured to receive signals and each of which are associated with a respective signal processing unit 214, 215 which may comprise any one or more of a high pass filter, a decimator, and a volume control unit. The IC 200 also comprises a clock unit 213 to receive a clock signal and a further signal processing unit 209 which may comprise any one or more of an equalisation unit, an interpolator and a decimator. The IC 200 of this example also comprises an audio serial port (ASP) 216 for transmission and reception of digital audio data with an external processor, and a second interface 220 that is also coupled to the control register 202 via the access control unit 207. The IC 200 further comprises an output interface 210 which may comprise any component through which the IC 200 is configured to interface with another component, such as an audio component. As such, the output 210 may schematically depict a plurality of interfaces. By way of example, the output 210 may comprise an accessory interface to enable the IC 200 to control an accessory. The output 210 may comprise any one or more of headphone, speaker, microphone, and/or amplifier etc. interface to enable the IC 200 to control headphones, a speaker, a microphone and/or an amplifier etc. The IC 200 also comprises an audio processor 217 connected to the output interface 210. The audio processor 217 may comprise an interpolator and/or a volume control unit and/or digital-to-analogue converter (DAC). The IC 200 also comprises a bus 208 via which a number of these elements communicate.

The first interface 201 may enable an external processor (not illustrated) to perform security-based programming or modifications of the IC 200 such as loading firmware into the control register 202 as described above with reference to FIG. 1 (e.g. in response to an indication that a request from a function of the IC 200 has been serviced by a processor). For example, the IC 200 may be booted, i.e. initialised, via the interface 201. The first interface 201 of the IC 200 is therefore configured to transmit a request for servicing by the external processor as well as to receive a firmware/configuration data initialisation write request from the external processor.

More specifically, via the first interface 201, each function of the IC 200 is configured to transmit a request (as described above) to the external processor and receive, via the first interface 201, an indication that one of those requests has been serviced, e.g. the request that was first serviced—for example, if the request was for a file download then the file may be received, or if the request was for an initialisation write then the initialisation write request is received via the interface 201 etc. Following an indication that its request was serviced, the function whose request was serviced (e.g. a "first function") is configured to, via the first interface 201, transmit a request for all firmware/configuration data for all functions of the IC 200. Once the processor receives this request it transmits, via the first interface 201, an initialisation write request for all of the firmware/configuration data, and in this way firmware/configuration data for each function is downloaded and loaded into the IC 200. This process will be further explained below with reference to FIGS. 4 and 5. The initial transmission by each function is effectively a means to establish a secure handshake between the processor and one of the functions of the IC 200 such that a single function can handle the initialisation of the IC 200 for all functions. An initial "transmit request" is therefore for an indication that at least one function is an "active" function (e.g. active for code loading), and is transmitted by each function, and the indication that one function's request (e.g. the request of a first function) was serviced first is a means of selecting which function (e.g. the first function) will handle the initialisation of the common memory space. The second "transmit request" is for the file/configuration data itself and is not transmitted by each function but only by the "selected" function (e.g. the first function). In some examples, each function transmitting a request for servicing may effectively be each function asking the processor for a token (the term "primer" may also be used, as below) file, as a mechanism to determine ownership, and the subsequently received files (following the second transmit request) may be real initialisation, configuration, patch, etc. files.

In this way, a generic FDL file is essentially overloaded as a side-band piece of information to indicate to the processor which function of the IC is "active" to be used as the primary code loading interface, thus providing a mechanism to detect and prevent multiple functions from initialising a common address space at the same time, by treating the first file as a special "token," and whilst every Function requests a token file whichever one gets serviced first proceeds with the initialisation of the entire memory space for all functions, while the other functions are blocked (even after their token file is transmitted).

In examples where the request transmitted from each entity is a file download request this process may comprise a request for a subset (e.g. not a full set) of files, for example a subset of the IC's firmware, or that function's firmware, or any function's firmware. The requested subset may be referred to as a "primer" file set, or primer set of files. In this example, servicing the request comprises receiving a set of the firmware and so the subsequent transfer of firmware comprises a remaining set of files (the full set minus the already-received subset/primer). In other examples, the request may be for a dummy and/or token file. In any case, the requested file may be used for the purpose of determining ownership for the subsequent initialisation of all of the firmware/configuration data.

The second interface 220 may enable an external processor to control the IC 200 during runtime. It will be appreciated therefore that secure boot/startup/initialisation of the IC 200 may be accomplished via the first interface 201 and runtime control may be achieved via the second interface 220. Audio data may be received at 211 and/or 212 that may be processed by 214, 215 and/or 209, before being output at 210 (after any further processing at 217) and the nature of the signal path through the IC 200 to process the audio data for outputting will depend on the input (e.g. a digital signal vs an analogue signal) and the output (e.g. amplifier etc.).

Figure 3:
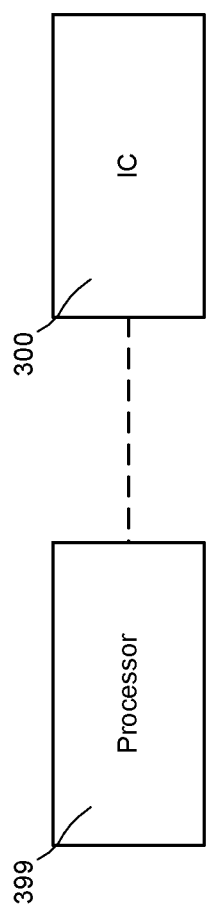
FIG. 3 is a simplified schematic diagram of an example integrated circuit in association with a processor.

FIG. 3 shows an IC 300 in communication with a processor 399. The processor 399 is external to the IC and may be referred to as a host processor or an external processor. The processor may comprise hardware executing instructions to run an operating system that, in turn, controls one or more functions of the IC 300. The processor 399 comprises a number of drivers (e.g. device drivers), with each driver being associated with a respective function of the IC 300. For example, the IC 300 may have a number of functions including an amplifier, microphone, jack codec, HID, etc. in which case the processor 399 has at least an equal number of device drivers, one for each function. The IC 300 may comprise the IC 100 or 200 as described above. As stated above, the IC 300 is configured to transmit a request for servicing by the processor 399.

More specifically, each function of the IC 300 is configured to transmit a request for servicing by its corresponding driver of the processor 399. The request may comprise any one of: a read request, a write request, a request to initialise a defined block of address ranges, a request to service a download (e.g. a download request) such as for a dummy or token file download, or a request to operate a portion of the function. The IC 300 is configured to determine for which function the request was serviced first and, in this way, that function may recognise that its driver is loaded and operable. The IC 300 is further configured to request, via this function, the transfer of all shared memory contents of the IC 300. The shared memory contents of the IC 300 may comprise firmware for at least one function of the IC and/or configuration data. In any case, once received, the IC 300 is configured to load that firmware or configuration data by writing it to allocated register addresses of the IC. The IC 300 is configured to determine which request has been serviced by the processor 399. The IC 300 (e.g. each function thereof) is further configured to determine a state of its control register, for example whether the shared memory space (e.g. those address ranges shared by all the functions of the IC 300) is fully initialised or not fully initialised and whether an initialisation is in progress. The IC 300 is configured to request the firmware and/or configuration data if (e.g. only if, or if and only if) it is determined that the shared memory ranges of the control register are not fully initialised and that no initialisation is in progress. As stated above, the IC 300 may be configured to request the transfer of shared memory contents by transmitting a class-conformant function mechanism, such as a file download (FDL) set request, a request for a set of files or control writes, a request to load a set of files or write a set of controls, or other mechanism(s).

With reference again to FIGS. 1 and 2, in one example, for each function there is stored an entity that will be referred to as an "extension unit" entity (XU entity) and the processor contains a corresponding XU driver. The XU entity for each function is configured to implement a functionality (for example a functionality that is user-defined, or not already programmed into the IC (non "class-conformant")). There may be multiple XU entities in a given IC, and each XU entity may be tied to a respective function (such as a particular audio function). Each XU entity may be unaware of other XU entities that may exist on the system. Via communication with the IC, each XU may service file download requests initiated by the IC. These requests may be serviced in any order, which will not be known until runtime and which may not be deterministic. Using the methods described herein, the XU may know which function is ready to receive the remaining set of files (e.g. initialisation, configuration, etc.) and which function or functions are blocked, as this download may be already in progress. The entity whose request was serviced first may become responsible for downloading the firmware and/or configuration data once an indication is received from the processor that the request was serviced, and then that entity may be configured to download a set of files from the processor. This is shown in FIG. 4.

Figure 4:
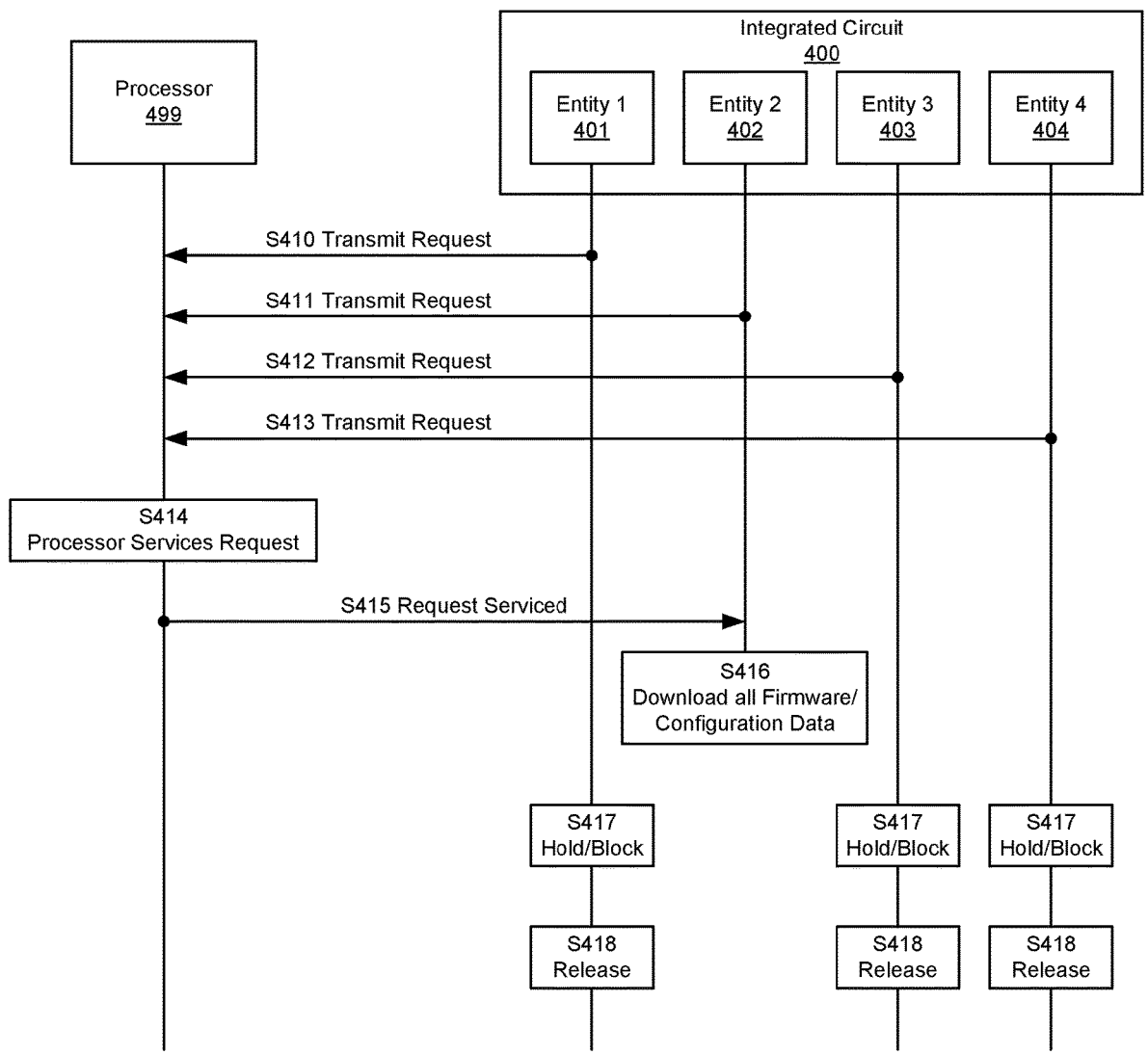
FIG. 4 is an example sequence diagram showing an example integrated circuit communicating with a processor.

FIG. 4 shows a sequence chart illustrating the flow of a process according to which the common memory space of an integrated circuit is initialised. As illustrated in FIG. 4, an integrated circuit 400 (e.g. the IC 100, 200, or 300 described above) is shown in association with a processor 499 (e.g. the processor 399). The IC 400 of this example has four functions and therefore four associated entities 401-404 (e.g. XU units). At S410-S413 each entity transmits a request for servicing by the processor 499. Although the transmit requests 410-413 are depicted as being transmitted in turn in FIG. 4, it should be noted that the requests 410-413 may be transmitted or not in any order, even concurrently. In another example, despite the IC having a plurality of functions, the IC may be configured such that only one of its functions is configured to transmit the request and, upon confirmation that this request has been serviced, downloads firmware and/or configuration data for all requests into the shared memory of the IC. Therefore, the examples herein provide for the full initialisation of an IC, even if some functions are disabled (e.g. by a user whether intentionally or inadvertently), since each present function communicates with the processor to indicate that it can handle the initialisation.

The processor 499 receives each request and, at S414, services one first. In this example to illustrate the invention, the request that the processor 499 services first was the request transmitted by the second entity 402 although it will be appreciated that the request transmitted by any of the four entities 401-404 could have been serviced first. At S415 the processor 499 services the request (and transmits an indication so the IC 400 receives an indication that this request was serviced) following which the second entity downloads all firmware/configuration data, at S416, so effectively a back and forth handshake between the processor 499 and the second entity 402 takes place and following that handshake being successful, the entity downloads all firmware and/or configuration data for itself and the other entities. Said another way, the host processor 499 "downloads" the data to the IC 400; once the IC 400 has been informed of the request serviced indication at S415, the second entity 402 applies all firmware/configuration data, making it available/effective for all function entities (401-404) within the IC 400. All remaining entities are placed in a hold (or wait or block etc.) state, at S417. The process of FIG. 4 may begin when the IC 400 powers on or on "bus attach" or "first attach." Put another way, the ICs described above may be configured such that each entity transmits its request on power-on, bus attach, or first attach.

Figure 5:
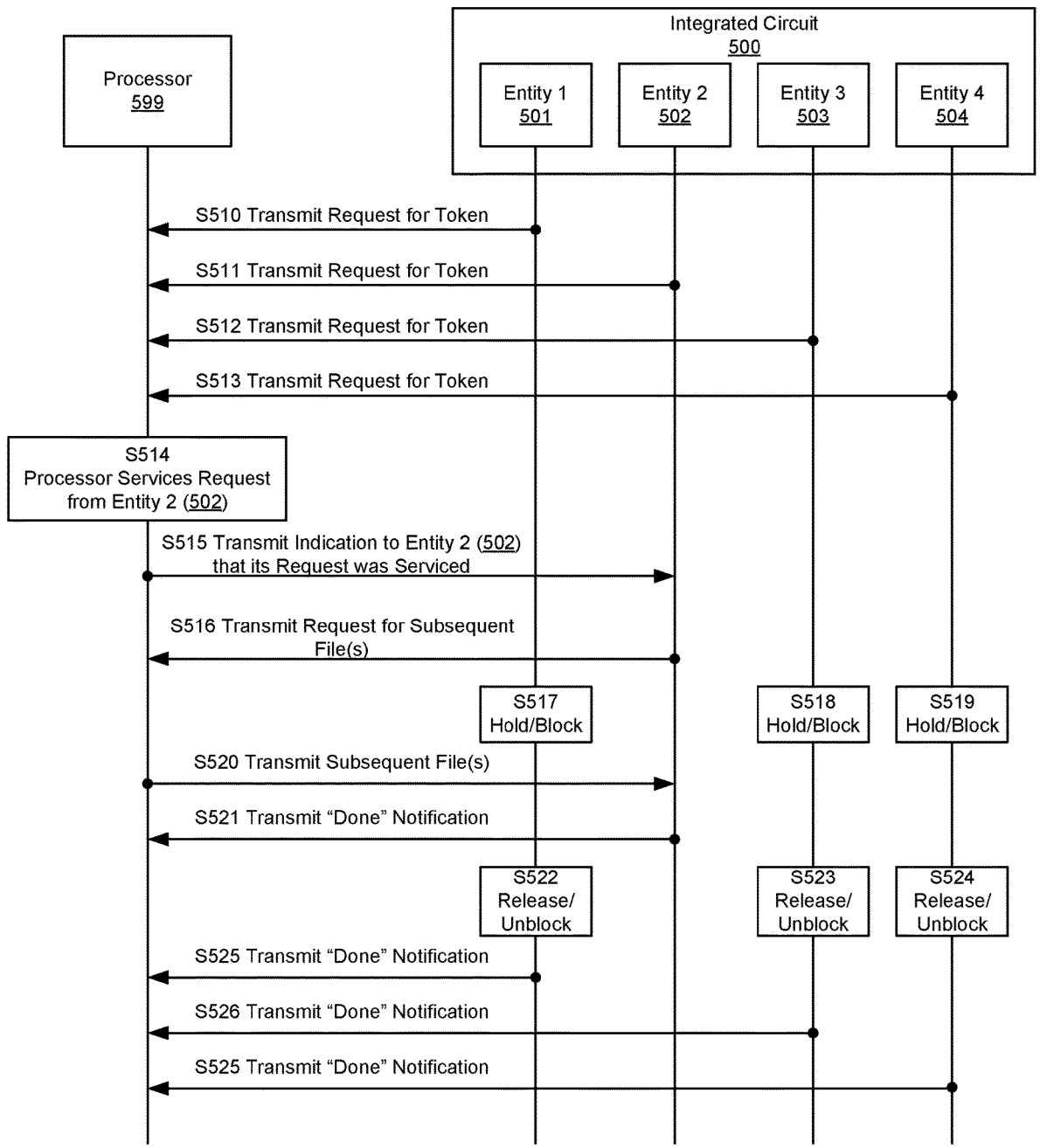
FIG. 5 is an example sequence diagram showing an example integrated circuit communicating with a processor.

FIG. 5 shows another sequence chart illustrating the flow of a process according to which the common memory space of an integrated circuit is initialised. FIG. 5 comprises FIG. 4 and is intended to show another example sequence in more detail. As for FIG. 4, an integrated circuit 500 (e.g. the IC 100, 200, 300, or 400 as described above) is shown in association with a processor 599 (e.g. the processor 399 or 499). As for FIG. 4, the IC 500 of this example has four functions and therefore four associated entities 501-504 (e.g. XU units). At S510-S513 each entity transmits a request for a token to the processor 599 for servicing by the processor 599. Although the transmit requests 510-513 are depicted as being transmitted in turn it should be noted that the requests 510-513 may be transmitted or not in any order, even concurrently. In another example, despite the IC having a plurality of functions, the IC may be configured such that only one of its functions is configured to transmit the request and, upon confirmation that this request has been serviced, downloads firmware and/or configuration data for all requests into the shared memory of the IC.

The processor 599 receives each request and, at S514, services one first. In this example to illustrate the invention, the request that the processor 599 services first was the request transmitted by the second entity 502 although it will be appreciated that the request transmitted by any of the four entities 501-504 could have been serviced first. At S515 the processor 599 transmits an indication to the second entity 502 that its request was serviced. Then, at S516, the second entity transmits a request for firmware and/or configuration data files while the remaining entities 501, 503, and 504 are placed in a hold, or wait, or block state (S517-S519). It will be appreciated that S516-S519 may be performed in any order, even concurrently. Effectively, a back and forth handshake has taken place between the processor 599 and the second entity 502 and, at S520, the processor 599 transmits firmware and/or configuration data for itself and the other entities. Said another way, the host processor 599 "downloads" the data to the IC 500 and the second entity 502 downloads/applies all firmware/configuration data, making it available/effective for all function entities (501-504) within the IC 500. Once finished, the second entity 502 transmits a notification, at S521, that the process is complete. Then, each of the remaining entities release their hold, or unblock themselves etc., at S522-S524. Then, at S525-S527 the remaining entities transmit their own notifications to the processor 599 to indicate that the process is complete. As for FIG. 4, the process of FIG. 5 may begin when the IC 500 powers on or on "bus attach" or "first attach." Put another way, the ICs described above may be configured such that each entity transmits its request on power-on, bus attach, or first attach.

Features of any given aspect or example may be combined with the features of any other aspect or example and the various features described herein may be implemented in any combination in a given example.

The skilled person will recognise that where applicable the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re-)programmable analogue array or similar device in order to configure analogue hardware.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. An integrated circuit configured to control an output component and configured to perform a plurality of audio functions that are related to the output component, the integrated circuit comprising a memory comprising register addresses allocated to said audio functions, wherein each of the plurality of audio functions of the integrated circuit is configured to transmit a request to an external processor, and wherein the integrated circuit is configured to receive an indication from the external processor that one of the requests was serviced, and configured such that whichever audio function is first to detect that its request has been serviced by the processor is configured to transmit a request for firmware and/or configuration data for itself and for at least one other of the audio functions, the integrated circuit being configured to download the firmware and/or configuration data into the integrated circuit by writing the firmware and/or configuration data to the register addresses allocated to said audio functions.

2. The integrated circuit of claim 1, wherein the request is made by utilising an SDCA class-conformant function mechanism.

3. The integrated circuit of claim 1, wherein each of the audio functions other than the audio function which is first to detect that its request has been serviced by the processor is blocked or held or placed in a wait state by utilising a class-conformant function mechanism.

4. The integrated circuit of claim 1, wherein the integrated circuit is configured to determine whether the memory is fully initialised and wherein each of the plurality of audio functions is configured to download the firmware and/or configuration data if it is determined that the memory is not fully initialised.

5. The integrated circuit of claim 1, wherein the integrated circuit is configured to determine whether an initialisation of the memory is in progress and wherein each audio function downloads the firmware and/or configuration data if it is determined that no initialisation of the memory is in progress.

6. The integrated circuit of claim 1, wherein the integrated circuit is configured such that the operation of each audio function other than the audio function which is first to detect that its request has been serviced by the external processor is blocked or held or placed in a wait state until the loading of the firmware and/or configuration data is complete.

7. The integrated circuit of claim 1, wherein the request is one of a file transfer request or a register write request.

* * * * *